United States Patent [19]

Crounse et al.

[11] 4,032,527

[45] June 28, 1977

[54] PHENYLJULOLIDINYLPHTHALIDES

[75] Inventors: Nathan N. Crounse, Cincinnati; Paul J. Schmidt, Sharonville, both of Ohio

[73] Assignee: Sterling Drug Inc., New York, N.Y.

[22] Filed: Nov. 27, 1974

[21] Appl. No.: 527,757

Related U.S. Application Data

[63] Continuation-in-part of Ser. No. 314,443, Dec. 12, 1972.

[30] Foreign Application Priority Data

Dec. 5, 1973 Canada .............................. 187401

[52] U.S. Cl. .................... 260/287 P; 260/247.2 R; 260/247.2 B; 260/293.58; 260/293.79; 260/326.34; 260/326.47; 260/517

[51] Int. Cl.² ...................................... C07D 215/38

[58] Field of Search .................... 260/343.4, 287 P

[56] References Cited

FOREIGN PATENTS OR APPLICATIONS 3,467  1/1972  Japan ............................ 260/343.4

OTHER PUBLICATIONS

Patterson et al., "The Ring Index" p. 452.

*Primary Examiner*—Anton H. Sutto
*Attorney, Agent, or Firm*—Theodore C. Miller; B. Woodrow Wyatt

[57] ABSTRACT

Substituted 3,3-diphenylphthalides, useful as color precursors, particularly in the art of pressure-sensitive duplicating systems, are prepared by condensing substituted 2-benzoylbenzoic acids with substituted anilines.

6 Claims, No Drawings

PHENYLJULOLIDINYLPHTHALIDES

This application is a continuation-in-part of our copending application Ser. No. 314,443, filed Dec. 12, 1972.

This invention relates to substituted 3,3-diphenylphthalides useful as color precursors, to substituted 2-benzoylbenzoic acids useful as intermediates in preparing said substituted 3,3-diphenylphthalides and to processes for preparing said substituted 3,3-diphenylphthalides.

In its substituted 3,3-diphenylphthalide aspect the invention provides 3-(2-X-4-X-phenyl)-3-(2-$Y^2$-4-$Y^4$-phenyl)-4-$Z^4$-5-$Z^5$-6-$Z^6$-7-$Z^7$-phthalide of the formula

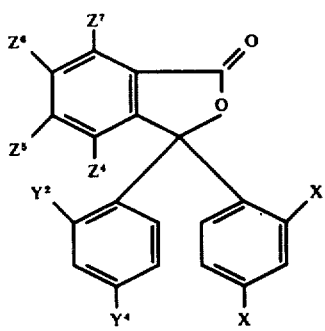

Formula I wherein:
X is dialkylamino wherein alkyl is non-tertiary alkyl of one to four carbon atoms;
$Y^2$ is hydrogen, non-tertiary alkyl of one to four carbon atoms, dialkylamino wherein alkyl is non-tertiary alkyl of one to four carbon atoms, alkanoylamino of two to five carbon atoms, non-tertiary alkoxy one to four carbon atoms or halo;
$Y^4$ is the same as $Y^2$ when $Y^2$ is dialkylamino; or dialkylamino, pyrrolidino, piperidino, morpholino, alkylbenzyl-amino, alkyl(4-alkoxyphenyl)amino or alkyl(Q-(CH$_2$)$_n$)-amino, wherein alkyl is non-tertiary alkyl of one to four carbon atoms, alkoxy is non-tertiary alkoxy of one to four carbon atoms, Q is hydroxy or chloro and n is two to four when $Y^2$ is other than dialkylamino; or, taken together with $Y^2$ and the phenyl ring, 9-julolidinyl;
$Z^4$ is hydrogen or halo;
$Z^5$ is hydrogen or halo; or non-tertiary alkyl of one to four carbon atoms, nitro, amino or dialkylamino wherein alkyl is non-tertiary alkyl of one to four carbon atoms when $Z^4$, $Z^6$ and $Z^7$ are each hydrogen;
$Z^6$ is hydrogen or halo; or non-tertiary alkyl of one to four carbon atoms, nitro, amino or dialkylamino wherein alkyl is non-tertiary alkyl of one to four carbon atoms when $Z^4$, $Z^5$ and $Z^7$ are each hydrogen; and
$Z^7$ is hydrogen or halo.

The compounds of Formula I are useful as color precursors, particularly in the art of pressure-sensitive duplicating systems.

In its substituted 2-benzoylbenzoic acid aspect the invention provides 2-(2-$Y'^2$-4-$Y'^4$-benzoyl)-3-$Z^4$-4-$Z'^5$-5-$Z'^6$-6-$Z^7$-benzoic acid of the formula

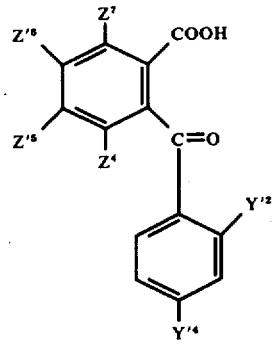

Formula II wherein:
$Y'^2$ is dialkylamino wherein alkyl is non-tertiary alkyl of one to four carbon atoms, alkanoylamino of two to five carbon atoms, or non-tertiary alkoxy of one to four carbon atoms;
$Y'^4$ is the same as $Y'^2$ when $Y'^2$ is dialkylamino; or dialkylamino, pyrrolidino, piperidino, morpholino, alkylbenzylamino, alkyl(4-alkoxyphenyl)amino or alkyl(Q'-(CH$_2$)$_n$)amino, wherein alkyl is non-tertiary alkyl of one to four carbon atoms, alkoxy is non-tertiary alkoxy of one to four carbon atoms, Q' is chloro and n is two to four when $Y'$2 is other than dialkylamino; or, taken together with $Y'^2$ and the phenyl ring, 9-julolidinyl;
$Z^4$ is hydrogen or halo;
$Z'^5$ is hydrogen or halo; or dialkylamino wherein alkyl is non-tertiary alkyl of one to four carbon atoms when $Z^4$, $Z'^6$ and $Z^7$ are each hydrogen;
$Z'^6$ is hydrogen or halo; or dialkylamino wherein alkyl is non-tertiary alkyl of one to four carbon atoms when $Z^4$, $Z'^5$ and $Z^7$ are each hydrogen;
$Z^7$ is hydrogen or halo and acid addition salts thereof.

The compounds of Formula II are useful as intermediates in the following processes for preparing compounds of Formula I.

In one of its process aspects the invention provides the process for preparing 3-(2-X-4-X-phenyl)-3-(2-$Y^2$-4-$Y'^4$-phenyl)-4-$Z^4$-5-$Z'''^5$-6-$Z'''^6$-7-$Z^7$-phthalide of the formula

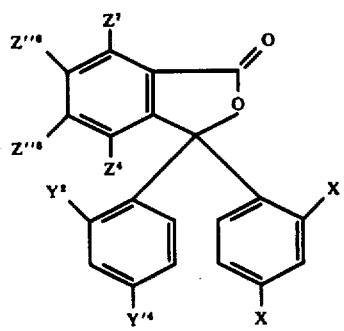

Formula III which comprises condensing 2-(2-$Y^2$-4-$Y'^4$-benzoyl)-3-$Z^4$-4-$Z'''^5$-5-$Z'''^6$-6-$Z^7$-benzoic acid of the formula

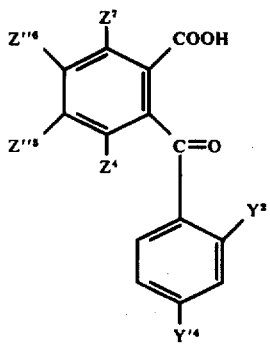

Formula IV with 1-X-3-X-benzene of the formula

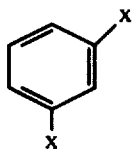

Formula V in contact with the anhydride of an alkanoic acid of two to five carbon atoms, phosphorus oxychloride or thionyl chloride, wherein:

X is dialkylamino wherein alkyl is non-tertiary alkyl of one to four carbon atoms;

$Y^2$ is hydrogen, non-tertiary alkyl of one to four carbon atoms, dialkylamino wherein alkyl is non-tertiary alkyl of one to four carbon atoms, alkanoylamino of two to five carbon atoms, non-tertiary alkoxy of one to four carbon atoms or halo;

$Y'^4$ is the same as $Y^2$ when $Y^2$ is dialkylamino; or dialkylamino, pyrrolidino, piperidino, morpholino, alkylbenzyl-amino, alkyl(4-alkoxyphenyl)amino or alkyl(Q'-(CH$_2$)$_n$)amino, wherein alkyl is non-tertiary alkyl of one to four carbon atoms, alkoxy is non-tertiary alkoxy of one to four carbon atoms, Q' is chloro and n is two to four when $Y^2$ is other than dialkylamino; or, taken together with $Y^2$ and the phenyl ring, 9-julolylidinyl;

$Z^4$ is hydrogen or halo;

$Z''^5$ is hydrogen or halo; or non-tertiary alkyl of one to four carbon atoms, nitro, dialkylamino wherein alkyl is non-tertiary alkyl of one to four carbon atoms when $Z^4$, $Z'''^6$ and $Z^7$ are each hydrogen;

$Z'''^6$ is hydrogen or halo; or non-tertiary alkyl of one to four carbon atoms, nitro, dialkylamino wherein alkyl is non-tertiary alkyl of one to four carbon atoms when $Z^4$, $Z''^5$ and $Z^7$ are each hydrogen; and $Z^7$ is hydrogen or halo.

In its other process aspect the invention provides the process for preparing 3-(2-X-4-X-phenyl)-3-(2-$Y^2$-4-$Y'^4$-phenyl)-4-$Z^4$-5-$Z''^5$-6-$Z'''^6$-7-$Z^7$-phthalide of Formula III which comprises condensing 2-(2-X-4-X-benzoyl)-3-$Z^4$-4-$Z''^5$-5-$Z'''^6$-6-$Z^7$-benzoic acid of the formula

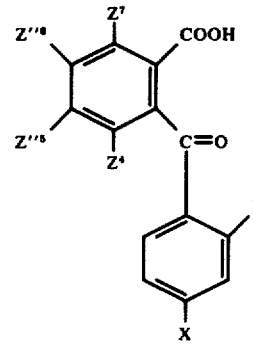

Formula VI with 1-$Y^2$-3-$Y'^4$-benzene of the formula

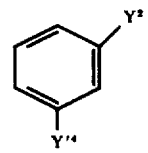

Formula VII in contact with the anhydride of an alkanoic acid of two to five carbon atoms, phosphorus oxychloride or thionyl chloride, wherein:

X is dialkylamino wherein alkyl is non-tertiary alkyl of one to four carbon atoms;

$Y^2$ is hydrogen, non-tertiary alkyl of one to four carbon atoms, dialkylamino wherein alkyl is non-tertiary alkyl of one to four carbon atoms, alkanoylamino of two to five carbon atoms, non-tertiary alkoxy of one to four carbon atoms or halo;

$Y'^4$ is the same as $Y^2$ when $Y^2$ is dialkylamino; or dialkylamino, pyrrolidino, piperidino, morpholino, alkylbenzylamino, alkyl(4-alkoxyphenyl)amino or alkyl-(Q'-(CH$_2$)$_n$)amino, wherein alkyl is non-tertiary alkyl of one to four carbon atoms, alkoxy is non-tertiary alkoxy of one to four carbon atoms, Q' is chloro and n is two to four when $Y^2$ is other than dialkylamino; or, taken together with $Y^2$ and the phenyl ring, 9-julolidinyl;

$Z^4$ is hydrogen or halo;

$Z''^5$ is hydrogen or halo; or non-tertiary alkyl of one to four carbon atoms, nitro, dialkylamino wherein alkyl is non-tertiary alkyl of one to four carbon atoms when $Z^4$, $Z'''^6$ and $Z^7$ are each hydrogen;

$Z'''^6$ is hydrogen or halo; or non-tertiary alkyl of one to four carbon atoms, nitro, dialkylamino wherein alkyl is non-tertiary alkyl of one to four carbon atoms when $Z^4$, $Z''^5$ and $Z^7$ are each hydrogen; and $Z^7$ is hydrogen or halo.

The foregoing two process aspects of the invention do not provide directly the compounds of Formula I wherein $Y^4$ is alkyl(Q-(CH$_2$)$_n$)amino wherein Q is hydroxy. However, such compounds are provided by carrying out either of the process aspects of the invention with the appropriate intermediates wherein Q is hydroxy and the anhydride of an alkanoic acid of two to five carbon atoms as the condensing agent, and dealkanoylating the resulting product wherein Q is the corresponding alkanoyloxy of two to five carbon atoms.

Nor do the foregoing two process aspects of the invention provide directly the compounds of Formula I wherein $Z^5$ or $Z^6$ is amino. However, such compounds are provided by carrying out either of the process aspects of the invention with the appropriate intermediates wherein $Z^5$ and $Z^6$ is amino and, if the anhydride of an alkanoic acid of two to five carbon atoms is used as the condensing agent, dealkanoylating the resulting product wherein $Z^5$ or $Z^6$ is the corresponding alkanoylamino of two to five carbon atoms.

The generic terms used to define the invention will now be defined.

Non-tertiary alkyl of one to four carbon atoms is methyl, ethyl, propyl, isopropyl, butyl, isobutyl or sec-butyl.

Alkanoylamino of two to five carbon atoms is acetamido, propionamido, butyrylamino, isobutyrylamino, valerylamino, isovalerylamino, α-methylbutyrylamino or pivaloylamino.

Non-tertiary alkoxy of one to four carbon atoms is methoxy, ethoxy, propoxy, isopropoxy, butoxy, isobutoxy or sec-butoxy.

Halo is fluoro, chloro, bromo or iodo.

The anhydrides of alkanoic acids of two to five carbon atoms are acetic anhydride, propionic anhydride, butyric anhydride, isobutyric anhydride, valeric anhydride, isovaleric anhydride, α-methylbutyric anhydride and pivalic anhydride.

One specific term requires further definition. 9-Julolidinyl has the structural formula

and is also named 2,3,6,7-tetrahydro-1H,5H-benzo[i,j]-quinolizin-9-yl.

The manner and process of making and using the invention and the best mode of carrying it out will now be described so as to enable any person skilled in the art to which it pertains to make and use it.

In carrying out the processes of the invention a mixture of 2-(2-$Y^3$-4-$Y'^4$-benzoyl)-3-$Z^4$-4-$Z''^5$-5-$Z''^6$-6-$Z^7$-benzoic acid of Formula IV and 1-X-3-X-benzene of Formula V or a mixture of 2-(2-X-4-X-benzoyl)-3-$Z^4$-4-$Z''^5$-5-$Z''^6$-6-$Z^7$-benzoic acid of Formula VI and 1-$Y^3$-3-$Y'^4$-benzene of Formula VII and the anhydride of an alkanoic anhydride, preferably acetic anhydride, phosphorus oxychloride or thionyl chloride with or without an inert diluent, is heated at a temperature in the range of 30°–150° C. In some cases the product of Formula III precipitates from the resulting mixture and may be isolated directly. Otherwise the resulting mixture is first acidified with a dilute aqueous mineral acid, for example, hydrochloric acid, and then basified, for example, with dilute aqueous sodium hydroxide, and the product is then isolated.

The compounds of Formula I wherein $Z^5$ or $Z^6$ is amino are alternatively provided by reduction of the corresponding compounds of Formula I wherein $Z^5$ or $Z^6$ is nitro with, for example, stannous chloride.

The compounds of Formula I wherein $Z^5$ or $Z^6$ is nitro are alternatively provided by nitration of the corresponding compounds of Formula I wherein $Z^5$ and $Z^6$ are hydrogen with, for example, a mixture of nitric acid and sulfuric acid. The nitration can produce the 5-nitro isomer, the 6-nitro isomer or a mixture of both.

The compounds of Formula I wherein $Z^5$ or $Z^6$ is halo are alternatively provided by halogenation of the diazonium salts derived from the corresponding compounds of Formula I wherein $Z^5$ or $Z^6$ is amino with, for example, fluoroboric acid, cuprous chloride, cuprous bromide or potassium iodide.

As stated above the compounds of Formula I are useful as color precursors, particularly in the art of pressure-sensitive duplicating systems. Like other color precursors in current use in this art the compounds of Formula I are colorless under neutral or basic conditions, but become colored when contacted with an acidic material such as silica gel, a phenolic resin or an acidic clay. It is sometimes desired that the images produced by such color precursors be copiable by xerographic means. A widely used diphenylphthalide color precursor is crystal violet lactone of the formula

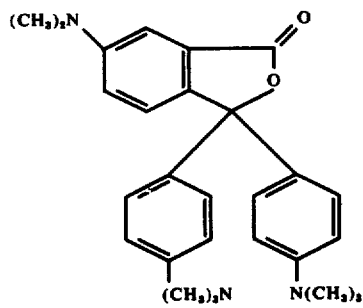

Crystal violet lactone produces a blue image which has the advantage of being intense but which suffers the disadvantage of being poorly copiable by xerographic means. To counteract this disadvantage other color presursors have been mixed with crystal violet lactone as described, for example, in U.S. Pat. No. 3,525,630. The images produced by the compounds of Formula I, although generally less intense in color than the images produced by crystal violet lactone, are readily copiable by xerographic means. For this reason the difficulties inherent in using mixed color precursors to achieve xerographic copiability can be avoided by using a compound of Formula I alone. As will be apparent on comparison, the structural feature of the compounds of Formula I which distinguishes them from crystal violet lactone is an additional dialkylamino in the ortho position of at least one of the 3-phenyls as shown by the duplicity of X.

The compounds of Formula IV and Formula VI, which include among them the compounds of Formula II, are prepared by condensing the corresponding $3Z^4$-$4$-$Z''^5$-$5$-$Z''^6$-$6$-$Z^7$-phthalic anhydrides of the formula

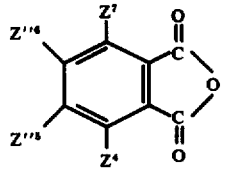

Formula VIII with the corresponding 1-$Y^3$-3-$Y'^4$-benzenes of Formula VII of 1-X-3-X-benzenes of Formula V, respectively, in contact with a Lewis acid, for example, aluminum chloride or zinc chloride, and with a diluent, for example, benzene, chlorobenzene or o-dichlorobenzene, at a temperature in the range of 20°–200° C. This condensation can produce isomers or mixtures of isomers when the $Z''^5$ or $Z''^6$ substituent of the compounds of Formula VIII is alkyl, nitro, dialkylamino or halo. Thus the derived compounds of Formula IV and Formula VI have the substituent at the 4-position or the 5-position. Compounds of Formula IV or Formula VI having the substituent in the 4-position or the 5-position produce the corresponding compounds of Formula I having the substituent in the 5-position or the 6-position.

Acid addition salts of the compounds of Formula II, Formula IV and Formula VI can be prepared with inorganic (mineral) or organic acids. If inorganic, the acid can be, for example, hydrochloric acid, hydrobromic acid, nitric acid, phosphoric acid, sulfuric acid or sulfamic acid. If organic, the acid can be, for example, acetic acid, glycolic acid, lactic acid, quinic acid, hydrocinnamic acid, succinic acid, tartaric acid, citric acid, methanesulfonic acid or benzenesulfonic acid.

The molecular structures of the compounds of Formula I, Formula II, Formula IV and Formula VI follow from the structures of the compounds of Formula V, Formula VII and Formula VIII and the synthetic method and may be identified and corroborated by observation of one or more of the following physical properties: color, melting point (m.p.), solubility behavior, acid-base behavior, thin layer chromatographic spectrum, infrared spectrum, mass spectrum, nuclear magnetic resonance spectrum and ultraviolet spectrum.

The compounds of Formula VIII wherein $Z_4$ is halo and $Z'''^5$ or $Z'''^6$ is nitro or halo are known. Some of the compounds of Formula VIII wherein $Z'''^5$ or $Z'''^6$ is dialkylamino are also known. Those which are not known can be prepared, for example, according to the method of U.S. Pat. 2,597,965 starting with diethyl 4-aminophthalate and, successively, appropriately N-alkylating, de-ethylating and cyclizing.

Some of the compounds of Formula V and the compounds of Formula VII wherein $Y^2$ is dialkylamino are known. Those which are not known can be prepared, for example, by appropriately N-alkylating m-phenylenediamine.

Some of the compounds of Formula VII wherein $Y^2$ is hydrogen are known. Those which are not known can be prepared by appropriately N-alkylating aniline. Julolidine is known.

Some of the compounds of Formula VII wherein $Y^2$ is alkyl are known. Those which are not known can be prepared, for example, starting with the appropriate alkylbenzene and, successively, 4-nitrating, reducing the nitro to amino, N-acetylating, 3-nitrating, deacetylating, deaminating, reducing the nitro to amino and appropriately N-alkylating.

Some of the compounds of Formula VII wherein $Y^2$ is alkanoylamino are known. Those which are not known can be prepared, for example, starting with m-nitroaniline and, successively, N-alkanolylating, reducing the nitro to amino and appropriately N-alkylating.

Some of the compounds of Formula VII wherein $Y^2$ is alkoxy are known. Those which are not known can be prepared, for example, starting with m-hydroxyacetanilide and, successively, appropriately O-alkylating, deacetylating and appropriately N-alkylating.

The foregoing methods also provide the corresponding compounds of Formula VII wherein $Y'^4$ is alkyl(hydroxy-$(CH_2)_n$)—amino which are not known.

The following examples illustrate the invention.

EXAMPLE 1

A. A mixture of phthalic anhydride (30 g.), N,N-dimethylaniline (60.5 g.), aluminum chloride (60 g.) and chlorobenzene (180 g.) was heated (to 75° C.) during one hour, then cooled. Ice (500 ml.) was added, the chlorobenzene layer was separated and the chlorobenzene was steam distilled. Addition of base to a solution of the residue in dilute sulfuric acid afforded 2-(4-dimethylamino)benzoyl)benzoic acid (IV: $Y^2 = Z^4 = Z'''^5 = Z'''^6 = Z^7 = H$, $Y'^4 = (CH_3)_2N$).

B. A mixture of 2-(4-(dimethylamino)benzoyl)benzoic acid (26.8 g.), N,N.N', N'-tetramethyl-m-phenylenediamine (16.4 g.) and acetic anhydride (80 g.) was heated (to 95° C.) during one hour, cooled and poured into dilute hydrochloric acid. The resulting mixture was basified. Recrystallization of the resulting solid from a mixture of toluene and hexane afforded 3-(2,4-bis(dimethylamino)phenyl)-3-(4-(dimethylamino)-phenyl)phthalide (I: $X = Y^4 = (CH_3)_2N$, $Y^2 = Z^4 = = Z^5 = Z^6 = Z^7 = H$) (m.p. 190°–194° C.).

When applied to acidic clay 3-(2,4-bis(dimethylamino)phenyl)-3-(4-(dimethylamino)phenyl)phthalide formed a gray-black image which was xerographically copiable.

C. Substituting N,N,N', N'-tetra(sec-butyl)-m-phenylenediamine (prepared by N-alkylating m-phenylenediamine with sec-butyl bromide for N,N,N', N'-tetramethyl-m-phenylenediamine in part B of this example, there is obtained 3-(2,4-bis(di-sec-butylamino)phenyl)-3-(4-dimethylamino) phenyl)phthalide (I: $X = (CH_3CH_2(CH_3)CH)_2N$, $Y^2 = Z^4 = Z^5 = Z^6 = Z^7 = H$, $Y^4 = (CH_3)_2N$).

D. Condensation of 2-(2,4-bis(dimethylamino)benzoyl)-benzoic acid and N,N-dimethylaniline in the presence of acetic anhydride also afforded 3-(2,4-bis(-dimethylamino)-phenyl)-3-(4-(dimethylamino)-phenyl)phthalide.

EXAMPLE 2

A. A mixture of phthalic anhydride (60 g.), N,N-diethyl-m-toluidine (162.8 g.), aluminum chloride (120 g.) and chlorobenzene (360 ml.) was heated (75-95° C.) during one and one-half hours, then diluted with water (200 ml., then more). More chlorobenzene (200 ml.) was added and the chlorobenzene layer was separated and steam distilled. Addition of sodium hydroxide solution (10%) to a solution of the residue in dilute sulfuric acid (20%, 250 ml.) afforded 2-(2-methyl-4-(diethylamino)benzoyl)benzoic acid (IV: $Y^2 = CH_3$, $Y'^4 = (CH_3CH_2)_2N$, $Z^4 = Z'''^5 = Z'''^6 = Z^7 = H$).

B. A mixture of 2-(2-methyl-4-(diethylamino)benzoyl)-benzoic acid (25 g.), N,N,N', N'-tetramethyl-m-phenylenediamine (13.2 g.) and acetic anhydride (75 g.) was heated (to 95° C.) during one hour, then refluxed with dilute hydrochloride acid (32 g. concentrated hydrochloric acid plus 160 ml. water) during 1½ hours. The resulting mixture was poured onto ice and the pH was adjusted to 6 with sodium hydroxide. Recrystallization of the resulting product afforded 3-(2,4-bis(dimethylamino)-phenyl-3-(2-methyl-4-(diethylamino)phenyl)phthalide (I: $X = (CH_3)_2N$, $Y^2 = CH_3$, $Y^4 = (CH_3CH_2)_2N$, $Z^4 = Z^5 = Z^6 = Z^7 = H$) in a first crop from toluene (m.p. 204°–206° C.) and in a second crop from a mixture of toluene and hexane (m.p. 191°–195° C.).

When applied to acidic clay 3-(2,4-bis(dimethylamino)-phenyl)-3-(2-methyl-4-(diethylamino)- phenyl)phthalide formed a violet-gray image which was xerographically copiable.

C. Substituting m-butyl-N,N-dimethylaniline (prepared by N-methylating m-butylaniline with dimethyl sulfate) for N,N-diethyl-m-toluidine in part A of this example, there is obtained 2-(2-butyl-4-(dimethylamino)benzoyl)benzoic acid (IV: $Y^2 = CH_3CH_2CH_2CH_2$, $Y'^4 = (CH_3)_2N$, $Z^4 = Z''^5 = Z''^6 = Z^7 = H$).

D. Substituting 2-(2-butyl-4-(dimethylamino)benzoyl)-benzoic acid for 2-(2-methyl-4-(diethylamino)-benzyl)benzoic acid in part B of this example, there is obtained 3-(2,4-bis(dimethylamino)phenyl-3-(2butyl-4-(dimethylamino)-phenyl)phthalide (I: $X = Y^4 = (CH_3)_2N$, $Y^2 = CH_3CH_2CH_2CH_2$, $Z^4 = Z^5 = Z^6 = Z^7 = H$).

E. Condensation of 2-(2,4-bis(dimethylamino)benzoyl)-benzoic acid and N,N-diethyl-m-toluidine in the presence of acetic anhydride also afforded 3-(2,4-bis(-dimethylamino)-phenyl-3-(2-methyl-4-(diethylamino)-phenyl)phthalide.

EXAMPLE 3

A. A mixture of phthalic anhydride (5.92 g.), N,N,N', N'-tetramethyl-m-phenylenediamine (6.56 g.) zinc chloride (5.40 g.) and chlorobenzene (70 ml.) was heated under reflux for three hours. The chlorobenzene was decanted and the residue was air-dried. A solution of the residue in dilute hydrochloric acid (10%, 20 ml. plus 20 ml. of water) was diluted with more water (20 ml.), affording 2-(2,4-bis-(dimethylamino)benzoyl)benzoic acid (II: $Y'^2 = Y'^4 = (CH_3)_2N$, $Z^4 = Z'^5 = Z'^6 = Z^7 = H$) dihydrochloride trihydrate (4 g., m.p. 136°-141° C.; after recrystallization from ethanol, m.p. 140°-141° C.). In another preparation the free base (m.p. 165°-168° C.) was obtained under less acidic conditions (pH 4-6).

B. A mixture of crude 2-(2,4-bis(dimethylamino)-benzoyl)benzoic acid (7 g.), N,N,N', N'-tetramethyl-m-phenylenediamine (1.64 g.) and acetic anhydride was warmed (at 25°-35° C.) during 2 to 3 hours, then poured into dilute hydrochloric acid (10%). The resulting mixture was basified and filtered with a filter aid. The filter cake was extracted with hot toluene. Dilution of the toluene extract with hexane afforded 3,3-bis(2,4-bis(dimethylamino)-phenyl)phthalide (I: $X = Y^2 = Y^4 = (CH_3)_2N$, $Z^4 = Z^5 = Z^6 = Z^7 = H$) (m.p. 186°-188° C.).

When applied to silica gel or standard field resin 3,3-bis(2,4-dimethylamino)phenyl)phthalide formed a red-brown image which was xerographically copiable.

C. Substituting N,N,N', N'-tetra (sec-butyl)-m-phenylenediamine for N,N,N', N'-tetrametyl-m-phenylenediamine in part A of this example, there is obtained 2-(2,4-bis(di-sec-butylamino)benzoyl)benzoic acid (II: $Y'^2 = Y'^4 = (CH_3CH_2-(CH_3)CH)_2N$, $Z^4 = Z'^5 = Z'^6 = Z^7 = H$).

D. Substituting N,N-diethyl-m-toluidine for N,N,N', N'-tetramethyl-m-phenylenediamine in part B of this example, there is obtained 3-(2,4-bis(dimethylamino)phenyl)-3-(2-methyl-4-(diethylamino)-phenyl)phthalide, the compound of part B of Example 2.

E. Substituting N-phenylpyrrolidine, N-phenylpiperidine or N-ethyl-N-(3-chloropropyl)aniline for N,N,N', N'-tetramethyl-m-phenylenediamine in part B of this example, there are obtained, respectively, 3-(2,4-bis(-dimethylamino)-phenyl-3-(4-pyrrolidinophenyl)phthalide (I: $X = (CH_3)_2N$, $Y^2 = Z^4 = Z^5 = Z^6 = Z^7 = H$,

3-(2,4-bis-(dimethylamino)-3-(4-piperidinophenyl)phthalide (I: $X = (CH_3)_2N$, $Y^2 = Z^4 = Z^5 = Z^6 = Z^7 = H$,

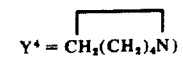

and 3-(2,4-bis(dimethylamino)phenyl)-3-(4-(ethyl(3-chloropropyl)amino)phenyl)phthalide (I: $X = (CH_3)_2N$, $Y^2 = Z^4 = Z^5 = Z^6 = Z^7 = H$, $Y^4 = CH_3CH_2(Cl(CH_2)_2)N$).

EXAMPLE 4

A. A mixture of 2-(2,4-bis(dimethylamino)benzoyl)-benzoic acid (2.4 g.), m-(dimethylamino)acetanilide (1.42 g.) and acetic anhydride (20 ml.) was stirred at room temperature during 2 hours filtered, diluted with dilute hydrochloric acid (10%) and made alkaline. Recrystallization of part of the resulting produce from a mixture of toluene, ligroin and hexane and part from a mixture of ethyl acetate and hexane afforded 3-(2,4-bis(dimethylamino)phenyl)-3-(2-acetamido-4-(dimethylamino)phenyl)phthalide (I: $X = Y^4 = (CH_3)_2N$, $Y^2 = CH_3CONH$, $Z^4 = Z^5 = Z^6 = Z^7 = H$) (m.p. 97°-136° C.).

When applied to standard field resin 3-(2,4-bis-(dimethylamino)phenyl)-3-(2-acetamido-4-(dimethylamino)-phenyl)phthalide formed a red-blue-brown image which was xerographically copiable.

B. Substituting m-(dimethylamino)-2,2-dimethylpropionalide (prepared by N-alkanolylating N,N-dimethylphenylenediamine with pivaloyl chloride) for m-(dimethylamino)acetanilide in part A of this example, there is obtained 3-(2,4-bis(dimethylamino)phenyl)-3-(2-pivaloyl-amino-4-(dimethylamino)phenyl)phthalide (I: $X = Y^4 = (CH_3)_2N$, $Y^2 = (CH_3)_3CCONH$, $Z^4 = Z^5 = Z^6 = Z^7 = H$).

C. Condensation of phthalic anhydride and m-(dimethylamino)acetanilide by the method of part A of Example 1 affords 2-(2-acetamido-4-(dimethylamino)benzoyl)benzoic acid (II: $Y'^2 = CH_3CONH$, $Y'^4 = (CH_3)_2N$, $Z^4 = Z'^5 = Z'^6 = Z^7 = H$).

D. Condensation of 2-(2-acetamido-4-(dimethylamino)benzoyl)benzoic acid and N,N,N',N'-tetramethyl-m-phenylenediamine by the method of part B of Example 1 affords 3-(2,4-bis(dimethylamino)-phenyl)-3-(2-acetamido-4-(dimethylamino)-phenyl)phthalide, the compound of part A of this example.

EXAMPLE 5

A. A mixture of phthalic anhydride (15 g.), m-ethoxyN,N-diethylanilne (19 g.), aluminum chloride (15 g.) and o-dichlorobenzene (90 g.) was heated (to 75° C.) during one hour, then diluted with ice-water. The o-dichlorobenzene layer was separated and steam distilled. Adjustment to pH 5 of a solution of the residue in dilute sulfuric acid (10%, 100 ml.) afforded 2-(2-ethoxy-4-(diethylamino)benzoyl)-benzoic acid (II: $Y'^2$ = $CH_3CH_2O$, $Y'^4$ = $(CH_3CH_2)_2N$, $Z^4$ = $Z'^5$ = $Z'^6$ = $Z^7$ = H) (11 g., m.p. 174°–181° C.).

B. A mixture of 2-(2-ethoxy-4-(diethylamino)benzoyl)-benzoic acid (6.82 g.), N,N,N',N'-tetramethyl-m-phenylenediame (2.80 g.) and acetic anhydride (20 g.) was heated (70°–75° C.) during one hour, let stand overnight and poured into dilute hydrochloric acid. The resulting mixture was basified. Recrystallization of the resulting red precipitate from hexane followed by slurrying in alkaline water afforded 3-(2,4-bis(dimethylamino)phenyl)-3-(2-ethoxy-4-diethylamino)-phenyl)phthalide (I: X = $(CH_3)_2N$, $Y^2$ = $CH_3CH_2O$, $Y^4$ = $(CH_3CH_2)_2N$, $Z^4$ = $Z^5$ = $Z^6$ = $Z^7$ = H) (m.p. 146°–150° C.).

When applied to acidic clay 3-(2,4-bis(dimethylamino)phenyl)-3-(2-ethoxy-4-(diethylamino)-phenyl)phthalide formed a blue-black image which was xerographically copiable.

C. Substituting m-isobutoxy-N,N-dimethylaniline (prepared by O-alkylating m-hydroxyacetanilide with isobutyl bromide, then deacetylating the resulting m-isobutoxy-acetanilide, then N-alkylating the resulting m-isobutoxy-aniline with methyl sulfate) for m-ethoxy-N,N-diethylaniline in part A of this example, there is obtained 2-(2-isobutoxy-4-(dimethylamino)benzoyl)-benzoic acid (II: $Y'^2$ = $(CH_3)_2CHCH_2O$, $Y'^4$ = $(CH_3)_2N$, $Z^4$ = $Z'^5$ = $Z'^6$ = $Z^7$ = H).

D. Substituting 2-(2-isobutoxy-4-(dimethylamino)-benzoyl)benzoic acid for 2-(2-ethoxy-4-(diethylamino)-benzoyl)benzoic acid in part B of this example, there is obtained 3-(2,4-bis(dimethylamino)phenyl)-3-(2-isobutoxy-4-(dimethylamino)phenyl)phthalide (I: X = $(CH_3)_2N$, $Y^2$ = $(CH_3)_2CHCH_2O$, $Y^4$ = $(CH_3)_2N$, $Z^4$ = $Z^5$ = $Z^6$ = $Z^7$ = H).

E. Condensation of phthalic anhydride and N-(m-anisyl)pyrrolidine (prepared from m-anisidine and 1,4-dibromobutane), N-(m-anisyl)piperidine (prepared from m-anisidine and 1,5-dibromopentane) or N-methyl-N-(2-chloroethyl)-m-anisidine (prepared from N-methyl-m-anisine and 1-bromo-2-chloroethane) by the method of part A of Example 1 affords, respectively, 2-(2-methoxy-4-pyrrolidinonenzoyl)benzoic acid (II: $Y'^2$ = $CH_3O$,

$Z^4$ = $Z'^5$ = $Z'^6$ = $Z^7$ = H), 2-(2-methoxy-4-piperidinobenzoyl)benzoic acid (II: $Y'^2$ = $CH_3O$,

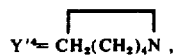

$Z^4$ = $Z'^5$ = $Z'^6$ = $Z^7$ = H) and 2-(2-methoxy-4-(methyl(2-chloroethyl)amino)-benzoyl)benzoic acid (II: $Y'^2$ = $CH_3O$, $Y'^4$ = $CH_3(ClCH_2CH_2)N$, $Z^4$ = $Z'^5$ = $Z'^6$ = $Z'^7$ = H).

F. Condensation of 2-(2-methoxy-4-pyrrolidinobenzoyl)-benzoic acid, 2-(2-methoxy-4-piperidinobenzoyl)benzoic acid or 2-(2-methoxy-4-(methyl(2-chloroethyl)amino)benzoyl)-benzoic acid with N,N,N',N'-tetramethyl-m-phenylenediamine by the method of part B of Example 1 affords, respectively, 3-(2,4-bis(dimethylamino)phenyl)-3-(2-methoxy-4-pyrrolidinophenyl)phthalide (I: X = $(CH_3)_2N$, $Y^2$ = $CH_3O$,

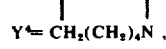

$Z^4$ = $Z^5$ = $Z^6$ = $Z^7$ = H), 3-(2,4-bis(dimethylamino)-phenyl)-3-(2-methoxy-4-piperidinophenyl)phthalide (I: X = $(CH_3)_2N$, $Y^2$ = $CH_3O$, $Z^4$ = $Z^5$ = $Z^6$ = $Z^7$ = H)and 3-(2,4-bis(dimethylamino)-phenyl)-3-(2-methoxy-4-(methyl(2-chloroethyl)amino)phenyl)phthalide (I: X = $(CH_3)_2N$, $Y^2$ = $CH_3O$, $Y^4$ = $CH_3(ClCH_2CH_2)N$, $Z^4$ = $Z^5$ = $Z^6$ = $Z^7$ = H).

EXAMPLE 6

A. A mixture of tetrachlorophthalic anhydride (21.4 g.), N,N-diethyl-m-toluidine (41 g.), aluminum chloride (30 g.) and o-dichlorobenzene (90 ml.) was heated (75°–95° C.) during one to two hours, then diluted with ice-water. The o-dichlorobenzene layer was separated and steam distilled. The residue was heated with dilute sulfuric acid. The mixture was poured onto ice and made alkaline. The resulting oil was heated in concentrated sulfuric acid. Dilution with water and purification of the product with toluene and hexane afforded 2-(2-methyl-4-(diethylamino)benzoyl)-3,4,5,6-tetrachlorobenzoic acid (IV: $Y^2$ = $CH_3$, $Y'^4$ = $(CH_3CH_2)_2N$, $Z^4$ = $Z''^5$ = $Z'''^6$ = $Z^7$ = Cl) (26 g., m.p. 117° C. with sublimation).

B. A mixture of 2-(2-methyl-4-(diethylamino)benzoyl)-3,4,5,6-tetrachlorobenzoic acid (22.4 g.), N,N,N',N'-tetramethyl-m-phenylenediamine (8.20 g.) and acetic anhydride (75 g.) was heated (to 95° C.) during one to two hours, then refluxed with dilute hydrochloric acid (32 g. concentrated hydrochloric acid plus 160 ml. water) during one and onehalf hours. The resulting mixture was poured into water and the pH was adjusted. Recrystallization of the resulting product from toluene afforded 3-(2,4-bis(dimethylamno)-phenyl)-3-(2-methyl-4-(diethylamino)phenyl)-4,5,6,7-tetrachlorophthalide (I: X = $(CH_3)_2N$, $Y^2$ = $CH_3$, $Y^4$ = $(CH_3CH_2)_2N$, $Z^4$ = $Z^5$ = $Z^6$ = $Z^7$ = Cl) (m.p. 237°–238° C.; after slurrying in acetone, 237°–239° C.).

When applied to acidic clay 3-(2,4-bis(dimethylamino)phenyl)-3-(2-methyl-4-(diethylamino)-phenyl)-4,5,6,7-tetrachlorophthalide formed an image which was xerographically copiable.

EXAMPLE 7

A. A mixture of tetrachlorphthalic anhydride (1.92 g.), N,N,N',N'-tetramethyl-m-phenylenediamine (1.64 g.), zinc chloride (1.35 g.) and chlorobenzene (40–45 ml.) was heated under reflux during three hours. the chlorobenzene layer was decanted and the residue was slurried with dilute hydrochloric acid (10%, 20 ml.) and water (20 ml.), affording 2-(2,4-bis(dimethylamino)benzoyl)-3,4,5,6-tetrachlorobenzoic acid (II: $Y'^2$ = $Y'^4$ = $(CH_3)_2N$, $Z^4$ = $Z'^5$ = $Z'^6$ = $Z^7$ = Cl) (m.p. 199°–201° C.).

B. A mixture of most of the 2-(2,4-bis(dimethylamino)-benzoyl)-3,4,5,6-tetrachlorobenzoic acid from part A of this example, N,N,N',N'-tetramethyl-m-phenylenediamine (0.82 g. plug 0.4 g.) and acetic anydride was heated under reflux. Concentration of a toluene extract of the resulting product gave a tar, which was slurried in hexane, affording 3,3-bis(2,4-bis(dimethylamino)phenyl)-4,5,6,7-tetrachlorophthalide (I: X = $Y^2$ = $Y^4$ = $(CH_3)_2N$, $Z^4$ = $Z^5$ = $Z^6$ = $Z^7$ = Cl) (m.p. 195°-197° C.).

When applied to acidic clay 3,3-bis(2,4-bis(dimethylamino)phenyl)-4,5,6,7-tetrachlorophthalide formed a red-blue image which was xerographically copiable.

C. Substituting tetrafluorophthalic anhydride, tetrabromophthalic anhydride or tetraiodophthalic anhydride for tetrachlorophthalic anhydride in part A of this example, there are obtained, respectively, 2-(2,4-bis(-dimethylamino)-benzoyl)-3,4,5,6-tetrafluorobenzoic acid (II: $Y'^2$ = $Y'^4$ = $(CH_3)_2N$, $Z^4$ = $Z'^5$ = $Z'^6$ = $Z^7$ = F), 2-(2,4-bis(dimethylamino)-benzoyl)-3,4,5,6-tetrabromobenzoic acid (II: $Y^2$ = $Y'^4$ = $(CH_3)_2N$, $Z^4$ = $Z'^5$ = $Z'^6$ = $Z^7$ = Br) and 2-(2,4-bis(dimethyl-amino)benzoyl)-3,4,5,6-tetraiodobenzoic acid (II: $Y'^2$ = $Y'^4$ = $(CH_3)_2N$, $Z^4$ = $Z'^5$ = $Z'^6$ = $Z'^7$ = I).

D. Substituting 2-(2,4-bis(dimethylamino)bezoyl)-3,4,5,6-tetrafluorobenzoic acid, 2-(2,4-bis(dimethylamino)-benzoyl)-3,4,5,6-tetrabromobenzoic acid or 2-(2,4-bis(dimethylamino)benzoyll)-3,4,5,6-tetraiodobenzoic acid for 2-(2,4-bis(dimethylamino)benzoyl)-3,4,5,6-tetrachlorobenzoic acid in part B of this example, there are obtained, respectively, 3,3;1-bis(2,4-bis(dimethylamino)phenyl)-4,5,6,7-tetrafluorophthalide (I: X = $Y^2$ = $Y^4$ = $(CH_3)_2N$, $Z^4$ = $Z^5$ = $Z^6$ = $Z^7$ = F), 3,3-bis(2,4-dimeethylamino)phenyl)-4,5,6,7-tetraromphthalide (I: X = $Y^2$ = $Y^4$ = $(CH_3)_2N$, $Z^4$ = $Z^5$ = $Z^5$ = $Z^6$ = $Z^7$ = Br) and 3,3-bis(2,4-bis(dimethylamino)phenyl)-4,5,6,7-tetraiodophthalide (I: X = $Y^2$ = $Y^4$ = $(CH_3)_2N$, $Z^4$ = $Z^5$ = $Z^6$ = $Z^7$ = I).

EXAMPLE 8

Three portions of a mixture of concentrated nitric acid (0.6 ml. each portion) and concentrated sulfuric acid (0.66 ml. each portion) were added to a mixture of 3-(2,4-bis(dimethylamino)phenyl)-3-(4-dimethylamino)phenyl)phthalide (4.17 g.) and concentrated sulfuric acid (20 ml.) with cooling. After each addition the temperature was allowed to rise to room temperature. The resulting mixture was poured onto ice and the resulting mixture was basified, affording 3-(24-bis(dimethylamino)phenyl)-3-(4-(dimethylamino)phenyl)5 or 6-nitrophthalide (I: X = $Y^4$ = $(CH_3)2N$, $Y^2$ = $Z^4$ = $Z^7$ = H, $Z^5$ or $Z^6$ = $O_2N$ and the other of $Z^5$ or $Z^6$ = H) or a mixture of both.

When applied to silica gel 3-(2,4-bis(dimethylamino)phenyl)-3-(4-dimethylamino)phenyl)-5 or 6-nitrophthalide formed a gray-black image which was xerographically copiable.

EXAMPLE 9

In a manner similar to that of Example 8 nitration of 3-(2,4-bis(dimethylamino)phenyl)-3-(2-methyl-4-(diethyl-amino)phenyl)phthalide (4.57 g.) afforded 3-(2,4-bis(dimethylamino)phenyl)-3-(2-methyl-4-(diethylamino)phenyl)-5 or 6-nitrophthalide (I: X = $(CH_3)_2N$, $Y^2$ = $CH_3$, $Y^4$ = $(CH_3CH_2)_2N$, $Z^4$ = $Z^7$ = H, $Z^5$ or $Z^6$ = $O_2N$ and the other of $Z^5$ or $Z^6$ = H) or a mixture of both.

When applied to silica gel 3-(2,4-bis(dimethylamino)-phenyl)-3-(2-methyl-4-(diethylamino)-phenyl)-5 or 6-nitrophthalide formed a gray-black image which was xerographically copiable.

EXAMPLE 10

A. Stannous chloride dihydrate (6.7 g.) was added slowly to a mixture of most of the product of Example 8 and concentrated hydrochloric acid (50 ml.) with heating (60° C.). After one hour the resulting mixture was cooled, made alkaline and filtered, affording 3-(2,4-bis(dimethylamino)-phenyl)-3-(4-(dimethylamino)phenyl)-5 or 6-aminophthalide (I: X = $Y^4$ = $(CH_3)_2N$, $Y^2$ = $Z^4$ = $Z^7$ = H, $Z^5$ or $Z^6$ = $H_2N$ and the other of $JZ^5$ or $Z^6$ = H) or a mixture of both.

When applied to silica gel 3-(2,4-bis(dimethylamino)phenyl-3-(4-(dimethylamino)henyl)-5or 6-amino-phthalide formed a gray-violet or gray-brown image which was xerographically copiable.

B. Condensation of 4-aminophthalic anhydride and N,N,N',N'-tetramethly-m-phenylenediamine by the method part A of Example 3 affords 2-(2,4-bis(dimethylamino)benzoyl)-5-aminobenzoic acid.

C. Condensation of 2-(2,4-bis(dimethylamino)benzoyl)-5-aminobenzoic acid and N,N,N',N'-tetramethyl-m-phenylenediamine by the method of part B of Example 3 and deacetylation of the resulting product affords 3,3-(2,4-bis(dimethylamino)phenyl)-6-aminophthalide (I: X = $Y^2$ = $Y^4$ = $(CH_3)_2N$, $Z^4$ = $Z^5$ = $Z^7$ = H, $Z^6$ = $H_2N$).

EXAMPLE 11

In a manner similar to that of Example 10 reduction of most of the product of Example 9 afforded 3-(2,4-bis-(dimethylamino)phenyl)-3-(2-methyl-4-(diethylamino)phenyl-5 or 6-aminophthalide (I: X = $(CH_3)_2N$, $Y^2$ = $CH_3$, $Y^4$ = $(CH_3CH_2)_2N$, $Z^4$ = $Z^7$ = H, $Z^5$ or $Z^6$ = $H_2N$ and the other of $Z^5$ or $Z^6$ = H) or a mixture of both.

When applied to silica gel 3-(2,4-bis(dimethylamino)phenyl)-3-(2-methyl-4-(diethylamino)-phenyl)-5 or 6-aminophthalide formed a gray-violet or gray-black image which was xerographically copiable.

EXAMPLE 12

A. A mixture of 4-(dimethylamino)phthalic anhydride (7 g.), N,N-dimethylaniline (9.12 g.), aluminum chloride (11.7 g.) and benzene (36.5 ml.) was stirred (for 10 min.) at ice-bath temperature, then overnight at room temperature. The mixture was then extracted with dilute sulfuric acid (20%, 80 ml.). Adjustment of the pH of the acidic extract to 5 afforded a mixture of 2-(4-(dimethylamino)benzoyl)-4-(dimethylamino)-benzoic acid (IV: $Y^2$ = $Z^4$ = $Z''^6$ = $Z^7$ = H, $Y'^4$ = $Z'''^5$ = $(CH_3)_2N$) and 2-(4-dimethylamino)benzoyl)-5-(dimethylamino)benzoic acid (IV: $Y^2$ = $Z^4$ = $Z''^5$ = $Z^7$ = H, $Y'4$ = $Z''^6$ = $(CH_3)_2N$) (6.3 g.).

B. A mixture of part (3.12 g.) of the mixture of products from part A of this example, N,N,N',N'-tetramethyl-m-phenylenediamine (1.5 g.) and acetic anhydride (20 g.) was heated (to 85° C.), then cooled. The resulting precipitate was washed with ether, washed with alkali and recrystallized from acetone, affording 3-(2,4-bis(dimethylamino)phenyl-3-(4-(dimethylamino)phenyl)-5-(dimethylamino)phthalide (I: X = $Y^4$ = $Z^5$ = $(CH_3)_2N$, $Y_2$ = $Z^4$ = $Z^6$ = $Z^7$ = H) (m.p. 222°-225° C.).

When applied to acidic clay 3-(2,4-bis(dimethylamino)-phenyl)-3-(4-dimethylamino)phenyl)-5-(dimethylamino)phthalide slowly formed a blue-gray image whichwas xerographically copiable.

C. The acetic anhydride filtrate from part B of this example was treated first with dilute hydrochloride acid (16 g. of concentrated acid plus 80 g. of water), then basified, affording 3-(2,4-bis(dimethylamino)-phenyl)-3-(4-(dimethyl-amino)phenyl)-6-(dimethylamino)phthalide (I: $X = Y^4 = Z^6 = (CH_3)_2N$, $Y^2 = Z^4 = Z^5 = Z^7 = H$) (m.p. 182°–185° C. after purification).

When applied to acidic clay 3-(2,4-bis(dimethylamino)phenyl-3-(4-(dimethylamino)phenyl)-6-(dimethylamino)-phthalide rapidly formed a violet-purple image which was xerographically copiable.

D. Propionic anhydride, phosphorus oxychloride or thionyl chloride can be substituted for acetic anhydride in part B of this example.

EXAMPLE 13

A. A mixture of 4-(dimethylamino)phthalic anhydride (1.91 g.), N,N,N',N'-tetramethyl-m-phenylenediamine (1.64 g.), zinc chloride (2.70 g.) and chlorobenzene (50 ml.) was heated under reflux during two hours. The chlorobenzene layer was decanted and the residue was slurried in water (80 ml.) and dilute hydrochloric acid (10%, 4 drops), affording 2-(2,4-bis(dimethylamino)benzoyl)-4-(dimethylamino)benzoic acid (II: $Y'^2 = Y'^4 = Z'^5 = (CH_3)_2N$, $Z^4 = Z'^6 = Z^7 = H$) (m.p. 216-222° C.) or the 5-(dimethylamino) isomer thereof.

B. A mixture of 2-(2,4-bis(dimethylamino)benzoyl)-4-(dimethylamino)benzoic acid or the 5-(dimethylamino) isomer thereof (10 g.), N,N,N'-tetramethyl-m-phenylenediamine (2.30 g.) and acetic anhydride (50 ml.) was warmed (at 30-35° C.) during one hour. More N,N,N',N'-tetramethyl-m-phenylenediamine (1.15 g.) was added and warming was continued. The mixture was diluted with dilute hydrochloric acid (10%) and ice and filtered. The filtrate was made alkaline. Crystallization of the product from toluene afforded 3,3-bis(2,4-bis(dimethylamino)phenyl)-5-(dimethylamino)phthalide (I: $X = Y^2 = Y^4 = Z^5 = (CH_3)_2N$, $Z^4 = Z^6 = Z^7 = H$) (m.p. 188°–192° C.) or the 6-(dimethylamino) isomer thereof.

C. Substituting N-ethyl-N-(4-hydroxybutyl)aniline for N,N,N',N'-tetramethyl-m-phenylenediamine in part B of this example and deacetylating the resulting product, there is obtained 3-(2,4-bis(dimethylamino)-phenyl)-3-(4-(ethyl(4-hydroxybutyl)amino)phenyl)-5-(dimethylamino)phthalide (I: $X = Z^5 = (CH_3)_2N$, $Y^2 = Z^4 = Z^6 = Z^7 = H$, $Y^4 = CH_3CH_2(HO(CH_2)_4)N$) or the 6-(dimethylamino) isomer thereof.

D. Substituting 4-methylphthalic anhydride, 4-nitrophthalic anhydride or 4-chlorophthalic anhydride for 4-(dimethylamino)phthalic anhydride in part A of this example, there are obtained, respectively, 2-(2,4-bis(-dimethylamino)benzoyl)-5-methylbenzoic acid (VI: $X = (CH_3)_2N$, $Z^4 = Z''^5 = Z^7 = H$, $Z'''^6 = CH_3$), 2-(2,4-bis(dimethylamino)benzoyl)-5-nitrobenzoic acid (VI: $X = (CH_3)_2N$, $Z^4 = Z'^5 = Z^7 = H$, $Z''^6 = O_2N$) and 2-(2,4-bis(dimethylamino)benzoyl-5-chlorobenzoic acid (VI: $X = (CH_3)_2N$, $Z^4 = Z''^5 = Z^7 = H$, $Z'^6 = Cl$).

E. Substituting 2-(2,4-bis(dimethylamino)benzoyl-5-methylbenzoic acid, 2-(2,4-bis(dimethylamino)benzoyl)-5-nitrobenzoic acid or 2-(2,4-bis(dimethylamino)benzoyl)-5-chlorobenzoic acid for 2-(2,4-bis(dimethylamino)benzoyl)-5-(dimethylamino)benzoic acid in part B of this example, there are obtained, respectively, 3,3-bis(2,4-bis(dimethylamino)-phenyl)-6-methylphthalide (I: $X = Y^2 = Y^4 = (CH_3)_2N$, $Z^4 = Z^5 = Z^7 = H$, $Z^6 = CH_3$) and 3,3-bis(2,4-bis(dimethylamino)-phenyl)-6-nitrophthalide (I: $X = Y^2 = Y^4 = (CH_3)_2N$, $Z^4 = Z^5 = Z^7 = H$, $Z^6 = O_2N$) and 3,3-bis(2,4-bis(dimethylamino)phenyl)-6-chlorophthalide (I: $X = Y^2 = Y^4 = (CH_3)_2N$, $Z^4 = Z^5 = Z^7 = H$, $Z^6 = Cl$).

EXAMPLE 14

Sodium nitrite is added to a mixture of 3,3-bis(2,4-bis(dimethylamino)phenyl)-6-aminophthalide in dilute hydrobromic acid. The resulting mixture is added to a solution of cuprous bromide in dilute hydrobromic acid, affording, after basification, 3,3-bis(2,4-bis(dimethylamino)phenyl)6-bromophthalide (I: $X = Y^2 = Y^4 = (CH_3)_2N$, $Z^4 = Z^5 = Z^7 = H$, $Z^6 = Br$).

EXAMPLE 15

A. A mixture of phthalic anhydride (30 g.), N,N-diethylaniline (71.6 g.), aluminum chloride (60 g.) and o-dichlorobenzene (200 ml.) was heated (to 75° C.), then diluted with ice (300 ml.) and water (500 ml.). The o-dichlorobenzene layer was separated and steam distilled. Addition of base to a solution of the residue in dilute sulfuric acid afforded 2-(4-diethylamino)benzoyl)benzoic acid (IV: $Y^2 = Z^4 Z''^5 = Z''^6 = Z^7 = H$, $Y'^4 = (CH_3CH_2)_2N$) (58.9 g., m.p. 179°—181° C.).

B. A mixture of 2-(4-diethylamino)benzoyl)benzoic acid (5.94 g.), N,N,N',N'-tetramethyl-m-phenylenediamine (3.61 g.) and acetic anhydride (3 ml.) was warmed (to 45° C.). Addition of methanol (20 ml.) afforded 3-(2,4-bis(dimethylamino)phenyl)-3-(4-(diethylamino)phenyl)phthalide (I: $X = (CH_3)_2N$, $Y^2 = Z^4 = Z^5 = Z^6 = Z^7 =$ and $H$, $Y^4 = (CH_3CH_2)_2N$) (6.8 g., m.p. 168-169.5° C.).

EXAMPLE 16

A mixture of 2-(4-dimethylamino)benzoyl)benzoic acid (8.07 g.), N,N,N',N'-tetraethyl-m-phenylenediamine (7.26 g.) and acetic anhydride (5 ml.) was heated (at 52° C.) during one and one-half hours. Addition of methanol (10 ml., then 15 ml.) afforded 3-(2,4-bis(diethylamino)phenyl)-3-(4-(dimethylamino)phenyl)phthalide (I: $X = (CH_3CH_2)_2N$, $Y^2 = Z^4 = Z^5 = Z^6 = Z^7 = H$, $Y^4 = (CH_3)_2N$) (10.92 g., m.p. 117-119° C.).

EXAMPLE 17

A mixture of 2-(4-diethylamino)benzoyl)benzoic acid (5.94 g.), N,N,N',N'-tetraethyl-m-phenylenediamine (4.84 g.) and acetic anhydride (3 ml.) was heated at 70° C. Addition of methanol (20 ml.) afforded 3-(2,4-bis(diethylamino)phenyl)-3-(4-(diethylamino)-phenyl)phthalide (I: $X = Y^4 = (CH_3CH_2)_2N$, $Y^2 = Z^4 = Z^5 = Z^6 = Z^7 = H$) (7.1 g., 135-137° C.).

EXAMPLE 18

A mixture of 2-(2-methyl-4-(diethylamino)benzoyl)-benzoic acid (12.48 g.), N,N,N',N'-tetraethyl-m-phenylenediamine (10.56 g.) and acetic anhydride (12 ml.) was warmed (at 40±8° C.) during one hour, diluted with water (50 ml., the 100 ml.), adjusted to pH 4.6 and filtered. The filtrate was clarified with water and adjusted to pH 5.5. Recrystallization of the resulting product (m.p. 134°–140° C.) from methanol afforded 3-(2,4-bis(diethylamino)phenyl)-3-(2-methyl-4-(diethylamino)phenyl)phthalide (I: $X = Y^4 = (CH_3CH_2)_2N$, $Y^2 = CH_3$, $Z^4 = Z^5 = Z^6 = Z^7 = H$) (m.p. 149-151° C.).

EXAMPLE 19

A. A mixture of tetrachlorophthalic anhydride (42.8 g.), N,N-dimethylaniline (61 g.), aluminum chloride (60 g.) and chlorobenzene (180 ml.) was heated (to 75° C.) during one and one-half hours, then diluted with ice-water (500 ml.). The chlorobenzene layer was separated and steam distilled. The residue was heated (to 95° C.) with dilute sulfuric acid (50%, 250 ml.) and cooled, affording 2-(4-(dimethylamino)benzoyl)-3,4,5,6-tetrachlorobenzoic acid (IV: $Y^2 = H$, $Y'^4 = (CH_3)_2$, $Z^4 = Z''^5 = Z''^6 = Z^7 = Cl$) (57.4 g., m.p. 216-217° C.).

B. A mixture of 2-(4-(dimethylamino)benzoyl)-3,4,5,6-tetrachlorobenzoic acid (20.3 g.), N,N,N',N'-tetramethyl-m-phenylenediamine (88%, 9.3 g.) and acetic anhydride (74 ml.) was heated (to 95° C.) during one hour, then cooled, affording 3-(2,4-bis(dimethylamino)phenyl-3-(4-(dimethylamino)-phenyl)4,5,6,7-tetrachlorophthalide (I: $X = Y^4 = (CH_3)_2N$, $Y^2 = H$, $Z^4 = Z^5 = Z^6 = Z^7 = Cl$) (20.3 g., m.p. 227-229° C.).

EXAMPLE 20

A. A mixture of tetrachlorophthalic anhydride (42.8 g.), N,N-diethylaniline (74 g.), aluminum chloride (60 g.) and chlorobenzene (180 ml.) was heated (to 75° C.) during one and one-half hours, then diluted with ice-water (500 ml.). The chlorobenzene layer was separated and steam distilled. Addition of sodium hydroxide solution (50%) to a solution of the residue in dilute sulfuric acid (50%, 250 ml.) afforded 2-(4-(diethylamino)benzoyl)-3,4,5,6-tetrachlorobenzoic acid (IV: $Y^2 = H$, $Y'^4 = (CH_3CH_2)_2N$, $Z^4 = Z''^5 = Z''^6 = Z^7 = Cl$) (59 g., m.p 228°-233° C.).

B. A mixture of 2-(4-(diethylamino)benzoyl)-3,4,5,6-tetrachlorobenzoic acid (8.70 g.), N,N,N',N'-tetramethyl-m-phenylenediamine (3.61 g.) and acetic anhydride (5 ml.) was heated (to 90° C.). Addition of methanol (10 ml.) and slurrying the resulting product with methanol afforded 3(2,4-bis(dimethylamino)-phenyl)-3-(4-(diethylamino)phenyl)-4,5,6,7-tetrachlorophthalide (I: $X = (CH_3)_2N$, $Y^2 = H$, $Y^4 = (CH_3CH_2)_2N$, $Z^4 = Z^5 = Z^6 = Z^7 = Cl$) (5.60 g., m.p. 206°-207.5° C.).

EXAMPLE 21

A mixture of 2-(4-(dimethylamino)benzoyl)-3,4,5,6-tetrachlorobenzoic acid (16.28 g.), N,N,N',N'-tetraethyl-m-phenylenediamine (9.68 g.) and acetic anhydride (10 ml.) was heated (at 91° C.) during 2 hours. Addition of methanol (20 ml., then 12 ml., then 10 ml.) afforded 3-(2,4-bis(diethylamino)phenyl)-3-(4-(dimethylamino)phenyl)-4,5,6,7-tetrachlorophthalide (I: $X = (CH_3CH_2)_2N$, $Y^2 = H$, $Y^4 = (CH_3)_2N$, $Z^4 = Z^5 = Z^6 = Z^7 = Cl$) in three fractions (m.p. 174-176° C., m.p. 180°-181° C. and m.p. 180°-181° C.).

EXAMPLE 22

A mixture of 2-(4-(diethylamino)benzoyl)-3,4,5,6-tetrachlorobenzoic acid (8.70 g.), N,N,N',N'-tetraethyl-m-phenylenediamine (4.85 g.) and acetic anhydride (5 ml.) was heated (to 90° C.). Addition of methanol (10 ml.) and slurrying the resulting product with methanol (20 ml.) afforded 3-(2,4-bis(diethylamino)-phenyl)-3-(4-(diethylamino)-phenyl)-4,5,6,7-tetrachlorophthalide (I: $X = Y^4 = (CH_3CH_2)_2N$, $Y^2 = H$, $Z^4 = Z^5 = Z^6 = Z^7 = Cl$) (7.85 g., m.p. 196°-197° C.).

EXAMPLE 23

A mixture of 2-(2-methyl-4-(diethylamino)benzoyl)3,4,5,6-tetrachlorobenzoic acid (44.9 g.), N,N,N',N'-tetraethyl-m-phenylenediamine (29.7 g.) and acetic anhydride (50 ml.) was heated (at 85-90° C.) during three hours. The resulting crystalline product was washed with methanol, slurried in hot ethanol and washed again with methanol, affording 3-(2,4-bis(-diethylamino)phenyl)-3-(2-methyl-4-(diethylamino)-phenyl)-4,5,6,7-tetrachlorophthalide (I: $X = Y^4 = (CH_3CH_2)_2N$, $Y^2 = CH_3$, $Z^4 = Z^5 = Z^6 = Z^7 = Cl$) (34.1 g., m.p. 162-164° C.).

EXAMPLE 24

A. A mixture of phthalic anhydride (11.2 g.), N,N-diethyl-m-chloroaniline (28.2 g.), aluminum chloride (30 g.) and chlorobenzene (75 ml.) was heated (to 90° C.), then diluted with water (300 ml.). The chlorobenzene layer was separated and steam distilled. Adjustment of the pH of the aqueous residue to about 3 afforded 2-(2-chloro-4-(diethylamino)-benzoyl)benzoic acid (II: $Y'^2 = Cl$, $Y'^4 = (CH_3CH_2)_2N$, $Z^4 = Z''^5 = Z''^6 = Z^7 = H$) (15.9 g., m.p. 140-144° C.).

B. A mixture of 2-(2-chloro-4-(diethylamino)benzoyl)-benzoic acid (6.61 g.), N,N,N',N'-tetraethyl-m-phenylenediamine (4.30 g.) and acetic anhydride (5 ml.) was allowed to stand overnight at room temperature, then diluted with methanol (10 ml.), affording 3-(2,4-bis(diethylamino)phenyl)3-(2-chloro-4-(diethylamino)phenyl)phthalide (I: $X = Y^4 = (CH_3CH_2)_2N$, $Y^2 = Cl$, $Z^4 = Z^5 = Z^6 = Z^7 = H$) (3.94 g., m.p. 141-143° C.).

By methods similar to those described in the foregoing examples the following additional 2-benzoylbenzoic acids of Formula IV (Table I) and 3,3-diphenylphthalides of Formula I (Table II) were prepared or can be prepared.

Table I

| 2-Benzoylbenzoic Acids | | | | | | | |
|---|---|---|---|---|---|---|---|
| Example | $Y^2$ | $Y'^4$ | $Z^4$ | $Z''^5$ | $Z''^6$ | $Z^7$ | M.p. (° C.) | % Yield |
| 25A | H | | Cl | Cl | Cl | Cl | 222-225 | 12 |
| 26A | H | $CH_3CH_2OCH_2CH_2N$ | H | H | H | H | 104-107 | 83 |
| 28A | $CH_3$ | $(CH_3CH_2)_2N$ | ———$H_2Cl_2$——— | | | | 199-206 | 68 |
| 29A | $CH_3$ | $(CH_3)_2N$ | Br | Br | Br | Br | 202-205 | 91 |
| 30A | H | $(CH_3CH_2)(C_6H_5CH_2)N$ | Cl | Cl | Cl | Cl | 116-132 | |
| 32A | $CH_3$ | $(CH_3)_2N$ | H | H | H | H | 106-110 | 64 |
| 33A | $(CH_3CH_2)_2N$ | $(CH_3CH_2)_2N$ | Cl | Cl | Cl | Cl | 174-178 | |
| 35A | H | $(CH_3CH_2)(C_6H_5CH_2)N$ | H | H | H | H | 197-200 | 39 |

Table I-continued

2-Benzoylbenzoic Acids

| Example | $Y^2$ | $Y'^4$ | $Z^4$ | $Z''^5$ | $Z''^6$ | $Z^7$ | M.p. (° C.) | % Yield |
|---|---|---|---|---|---|---|---|---|
| 36A | H | $CH_2(CH_2)_3N$ | Cl | Cl | Cl | Cl | 100–102 | 69 |
| 37A | $CH_3$ | $CH_2(CH_2)_3N$ | Cl | Cl | Cl | Cl | 58–66 | 84 |
| 38A | ——9-julolidinyl—— | | H | H | H | H | 221–226 | 85 |
| 39A | H | $CH_2(CH_2)_3N$ | H | H | H | H | 110–120 | 22 |
| 41A | H | $CH_3(4-CH_3OC_6H_4)N$ | H | H | H | H | 235–242 | 30 |
| 42A | H | $CH_3(4-CH_3OC_6H_4)N$ | Cl | Cl | Cl | Cl | 128–130 | 66 |
| 43A | $CH_3$ | $CH_2(CH_2)_3N$ | H | H | H | H | 183–187 | 80 |
| 44A | ——9-julolidinyl—— | | Cl | Cl | Cl | Cl | 222–231 | 95 |
| 45A | H | $CH_2(CH_2)_3N$ | H | H | H | H | 200 dec. | 71 |
| 47A | $(CH_3CH_2)_2N$ | $(CH_3CH_2)_2N$ | H | H | H | H | 189–190 | 17 |

Table II

3,3-Diphenylphthalides

| Example | X | $Y^2$ | $Y^4$ | $Z^4$ | $Z^5$ | $Z^6$ | $Z^7$ | M.p. (° C.) | % Yield |
|---|---|---|---|---|---|---|---|---|---|
| 25B | $(CH_3)_2N$ | H | $CH_2CH_2OCH_2CH_2N$ | Cl | Cl | Cl | Cl | 250–251 | 20 |
| 26B | $(CH_3)_2N$ | H | $CH_2CH_2OCH_2CH_2N$ | H | H | H | H | 208–210 | 64 |
| 27 | $(CH_3CH_2)_2N$ | H | $CH_2CH_2OCH_2CH_2N$ | H | H | H | H | 157–158 | 96 |
| 28B | $(CH_3CH_2)_2N$ | $CH_3$ | $(CH_3CH_2)_2N$ | —— $H_2Cl_2$ —— | | | | 169–172 | 18 |
| 29B | $(CH_3)_2N$ | $CH_3$ | $(CH_3CH_2)_2N$ | Br | Br | Br | Br | 245–246 | 51 |
| 30B | $(CH_3)_2N$ | H | $(CH_3CH_2)(C_6H_5CH_2)N$ | Cl | Cl | Cl | Cl | 180–182 | 26 |
| 31 | $(CH_3)_2N$ | H | | H | H | $(CH_3)_2N$ | H | 128–130 | |
| 32B | $(CH_3)_2N$ | $CH_3$ | $CH_2(CH_2)_3N$ $(CH_3)_2N$ | H | H | H | H | 224–228 | 64 |
| 33B | $(CH_3)_2N$ | $(CH_3CH_2)_2N$ | $CH_2(CH_2)_3N$ | Cl | Cl | Cl | Cl | 132–135 | |
| 34 | $(CH_3)_2N$ | $CH_3$ | $(CH_3CH_2)_2N$ | —— $H_2Cl_2$ —— | | | | 186–192 | 32 |
| 35B | $(CH_3)_2N$ | H | $(CH_3CH_2)(C_6H_5CH_2)N$ | H | H | H | H | 130–132 | 98 |
| 36B | $(CH_3)_2N$ | H | | Cl | Cl | Cl | Cl | 276–279 | 43 |
| 37B | $(CH_3)_2N$ | $CH_3$ | $CH_2(CH_2)_3N$ | Cl | Cl | Cl | Cl | 245–249 | 56 |
| 38B | $(CH_3)_2N$ | ——9-julolidinyl—— | | H | H | H | H | 198–202 | 77 |
| 39B | $(CH_3)_2N$ | H | $CH_2(CH_2)_3N$ | H | H | H | H | 192–194 | 68 |
| 40 | $(CH_3CH_2)_2N$ | H | $(CH_3)_2N$ | H | H | $(CH_3)_2N$ | H | 68–72 | 74 |
| 41B | $(CH_3)_2N$ | H | $CH_3(4-CH_3OC_6H_4)N$ | H | H | H | H | 155–158 | |
| 42B | $(CH_3)_2N$ | H | $CH_3(4-CH_3OC_6H_4)N$ | Cl | Cl | Cl | Cl | 254–256 | 21 |
| 43B | $(CH_3)_2N$ | $CH_3$ | $CH_2(CH_2)_3N$ | H | H | H | H | 244–247 | 59 |
| 44B | $(CH_3)_2N$ | ——9-julolidinyl—— | | Cl | Cl | Cl | Cl | 236–238 | 40 |
| 45B | $(CH_3)_2N$ | H | | H | H | H | H | 192–194 | 63 |
| 46 | $CH_2(CH_2)_3N$ | $CH_3$ | $CH_2(CH_2)_4N$ $(CH_3CH_2)_2N$ | H | H | H | H | 163–165 | 16 |
| 47B | $(CH_3CH_2)_2N$ | $(CH_3CH_2)_2N$ | $(CH_3CH_2)_2N$ | H | H | H | H | 149–151 | 33 |
| 48 | $(CH_3CH_2)_2N$ | H | $(CH_3CH_2)(C_6H_5CH_2)N$ | Cl | Cl | Cl | Cl | 139–142 | 39 |
| 49 | $(CH_3CH_2)_2N$ | $(CH_3CH_2)_2N$ | $(CH_3CH_2)_2N$ | Cl | Cl | Cl | Cl | 110–117 | 27 |
| 50 | $CH_2(CH_2)_3N$ | $CH_3$ | $(CH_3CH_2)_2N$ | Cl | Cl | Cl | Cl | 135–137 | 84 |

We claim:
1. 3-(2-X-4-X-Phenyl)-3-(9-julolidinyl)-4-$Z^4$-5-$Z^5$-6-$Z^6$-7-$Z^7$-phthalide of the formula

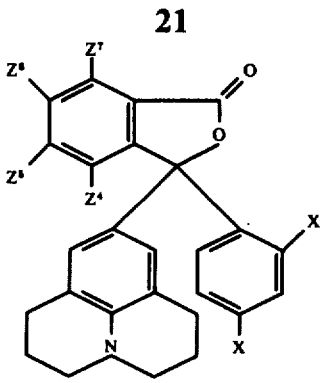

wherein:
X is dialkylamino wherein alkyl is non-tertiary alkyl of one to four carbon atoms;
$Z^4$ is hydrogen or halo;
$Z^5$ is hydrogen or halo; or non-tertiary alkyl of one to four carbon atoms, nitro, amino or dialkylamino wherein alkyl is non-tertiary alkyl or one to four carbon atoms when $Z^4$, $Z^6$ and $Z^7$ are each hydrogen;

$Z^6$ is hydrogen or halo; or non-tertiary alkyl of one to four carbon atoms, nitro, amino or dialkylamino wherein alkyl is non-tertiary alkyl of one to four carbon atoms when $Z^4$, $Z^5$ and $Z^7$ are each hydrogen; and $Z^7$ is hydrogen or halo.

2. A compound according to claim 1 wherein $Z^4$, $Z^5$, $Z^6$ and $Z^7$ are each hydrogen.

3. A compound according to claim 2 wherein X is dimethylamino.

4. A compound according to claim 1 wherein $Z^4$, $Z^5$, $Z^6$ and $Z^7$ are each halo.

5. A compound according to claim 4 wherein halo is chloro.

6. A compound according to claim 5 wherein X is dimethylamino.

* * * * *